Dec. 26, 1939.   F. A. HOWARD   2,184,839
MECHANICAL MOVEMENT
Original Filed Jan. 3, 1933    5 Sheets-Sheet 1

Frank A. Howard Inventor
By P. L. Young Attorney

Dec. 26, 1939.  F. A. HOWARD  2,184,839
MECHANICAL MOVEMENT
Original Filed Jan. 3, 1933   5 Sheets-Sheet 3

Frank A. Howard Inventor
By P. L. Young Attorney

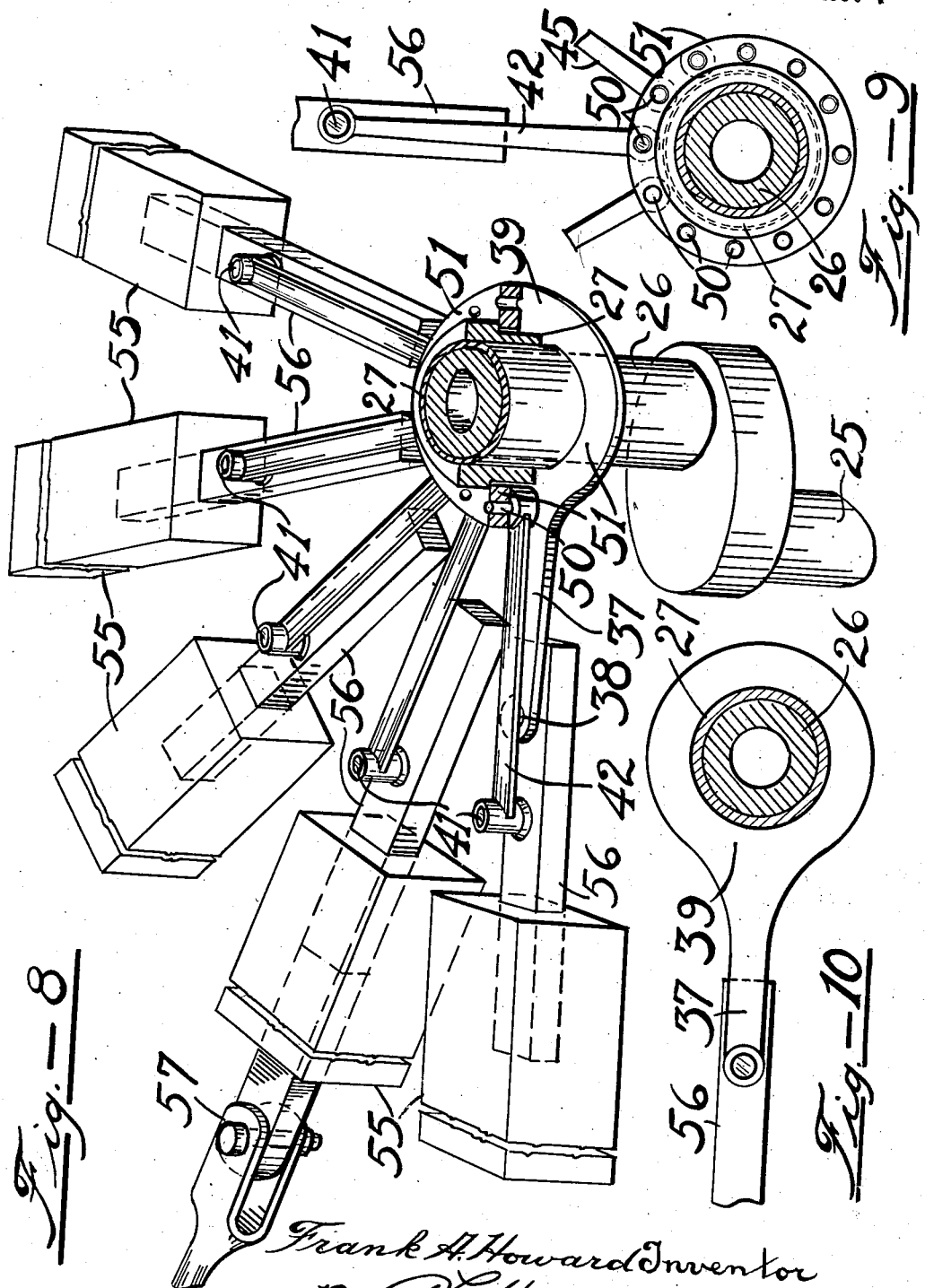

Dec. 26, 1939.  F. A. HOWARD  2,184,839
MECHANICAL MOVEMENT
Original Filed Jan. 3, 1933  5 Sheets-Sheet 5
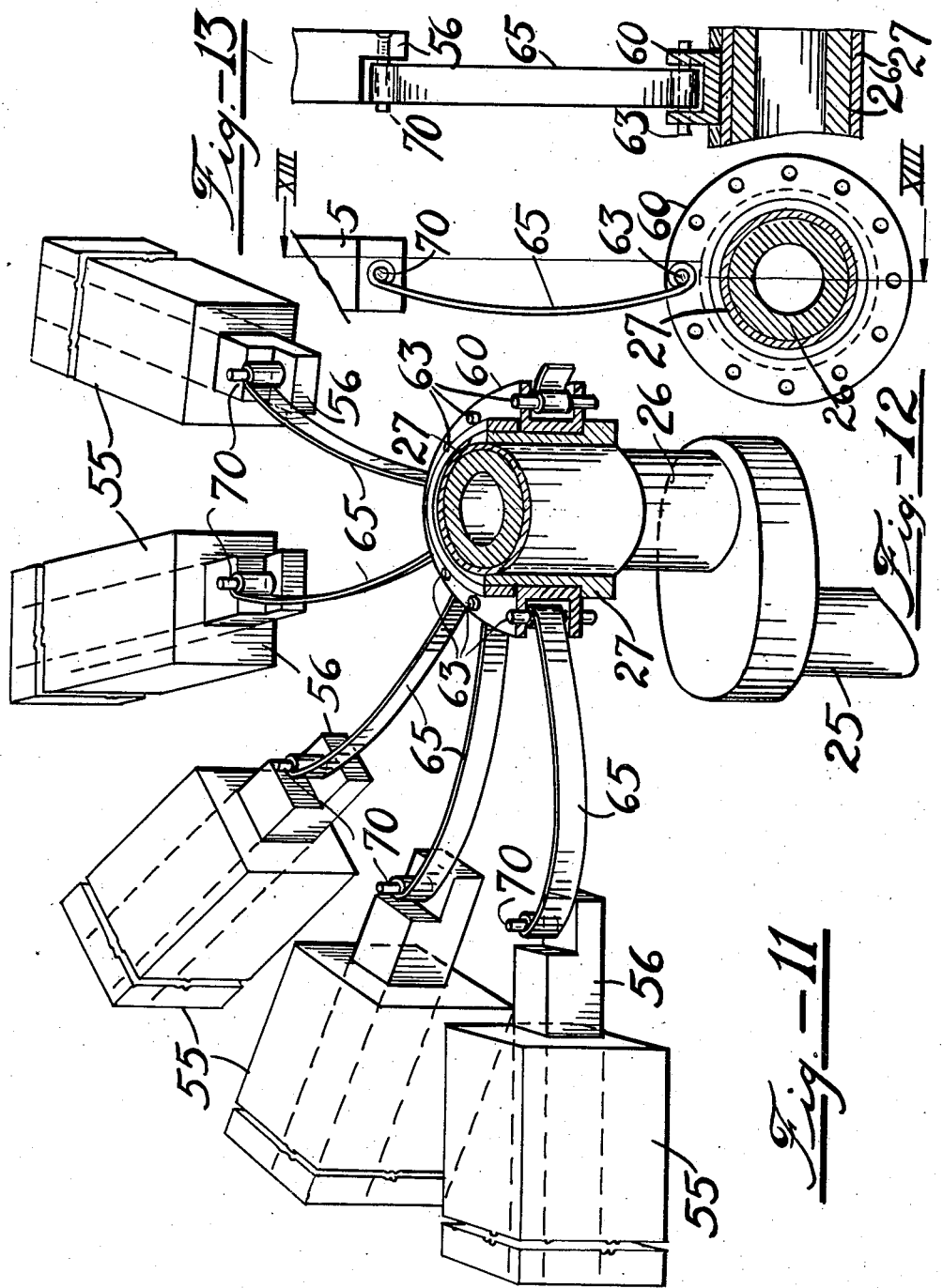

Patented Dec. 26, 1939

2,184,839

UNITED STATES PATENT OFFICE 2,184,839

MECHANICAL MOVEMENT

Frank A. Howard, Elizabeth, N. J.

Original application January 3, 1933, Serial No. 650,018. Divided and this application July 10, 1937, Serial No. 152,878

6 Claims. (Cl. 74—580)

This invention relates to an improved mechanical movement. More particularly, it relates to an improved connecting means between a rotary member and a plurality of reciprocably mounted members.

This application is a division of my previously filed application Serial No. 650,018, filed January 3, 1933, entitled "Rotary engine", now U. S. Patent No. 2,112,844, dated April 5, 1938.

It is an object of this invention to provide a mechanism for connecting a plurality of reciprocably mounted sliders to a crank shaft having a relatively short crank pin.

It is a further object of this invention to transmit power between a number of reciprocably mounted sliders and a crank pin with a minimum loss of energy due to friction.

Other objects will be apparent from the specification and from the accompanying drawings, in which latter Figure 1 is a perspective view, with parts broken away, of a preferred form of the apparatus in its simplest form for carrying out the invention;

Figure 8 is a perspective view showing the apparatus applied to a plurality of separate guideways;

Figure 9 is a side elevational view showing a detail of the connection between the link bearing ring, the crank pin, and the connecting rods;

Figure 10 is a side elevational view showing a detail of the connection of the master rod with the master slider and the hub of the crank pin;

Figure 11 is a perspective view showing the use of a flexible connecting rod between the crank pin and a plurality of sliders;

Figure 12 is a side elevational view of the connection of a single elastic link rod with the crank pin and sliders; and Figure 13 is a transverse sectional view taken along the line XIII—XIII of Figure 12.

Figures 1, 2:
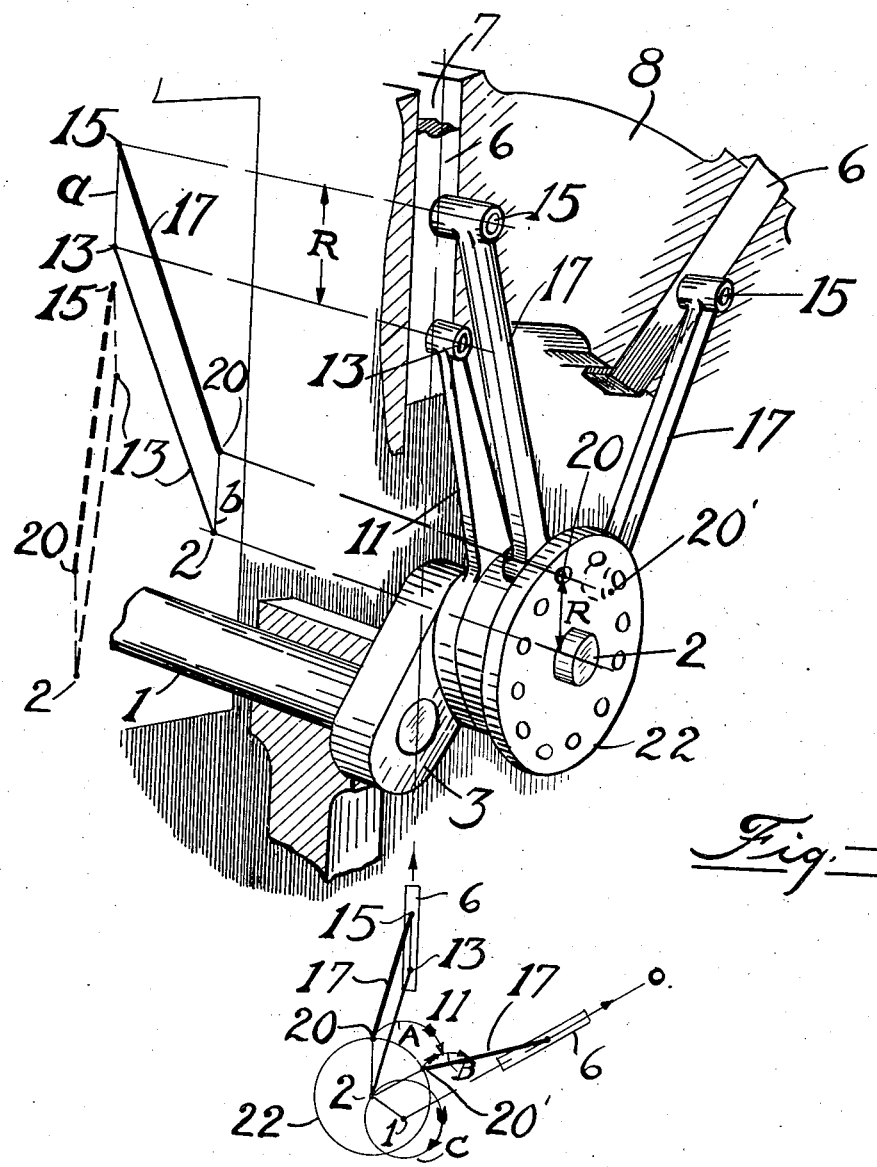
Figure 2 is a skeleton drawing showing the development of the mechanism of Figure 1.

Referring particularly to Figures 1 and 2 of the drawings, the device comprises a crank shaft 1 having a crank pin 2 and crank 3. A plurality of sliders 6 are guided in slots 7 of a member 8 to have a radially reciprocating motion.

The sliders 6 are actuated by the following mechanism: One of the sliders 6, called the master slider, has a connecting rod 11 journaled at its outer end on a pin 13 secured to the slider. The opposite end of the connecting rod 11 is journaled on the crank pin 2. This rod 11 is called the master rod. The same slider 6 which carries the master rod 11 carries also a pin 15 which serves as a bearing for a master link 17. This master link 17 is identical with other links 17 connected to other sliders 6, but is distinguished as the master link because its motion is determined by the motion of the master rod 11 connected with the same slider.

The inner end of the master link 17 is journaled on a bearing pin 20 carried by a link bearing or plate or member 22 which is freely mounted on the crank pin 2. All of the other sliders 6 are provided with link rods 17 journaled at their outer ends on pins 15 and at their inner ends on the link bearing ring 22. The length of the master link 17, and all of the other link rods between centers, is the same as that of the master rod 11.

In the position of the mechanism as shown, the projection of the centers of members 15, 13, 2 and 20 onto a plane as illustrated in Figure 1 at right angles to the axis of the crank shaft gives the corners of a parallelogram 13, 15, 20 and 2. With the master slider 6 constrained to move vertically, it is obviously impossible for bearing ring 22 to turn on its own center, as this would involve the projected parallelogram 20 turning around 2 with points 13 and 15 fixed.

During rotation of the crank shaft, the parallelogram takes up different forms and positions, one of which is illustrated in dotted lines in Figure 1, but the side $a$ connecting points 15 and 13, and the side $b$ connecting points 2 and 20, always remain vertical. The center of the bearing ring 22 moves in the circle described by the center of the crank pin 2. Since the bearing ring 22 can not move with reference to its own center, every point in it describes a circle of radius equal to the throw of the crank 3.

Referring to the skeleton drawing illustrated in Figure 2, the crank pin 2 revolves in the circle C. Any point on 22 revolves in a similar circle, such as 20 revolving in circle A, the center of which is on the vertical center line. 15 gets the same motion from 20 as 13 gets from 2. Any slight inaccuracy in construction would not bind the mechanism but would cause a slight oscillation of 22 on 2.

Another point 20' spaced at an angle 20—2—20' from the point 20 moves in a circle designated B. The center of the circle B is on a line 1—0, making an angle with the vertical center line equal to 20—2—20'. A slider, the path of which is on the line 1—0, driven by 20' with a rod 17 of length equal to the master rod 17 would thus have a motion exactly the same as the slider 6, but with a lag behind the slider 6 corresponding with the angle 20—2—20'. The two sliders thus get exactly the same motion as if driven directly by the crank pin 2. Consequently, a number of sliders with center lines equally spaced around 1, driven by pins equally spaced around 2, would get the same motion as if driven directly from 2.

With the mechanism at rest, suppose 20' to be attached to 22 (or 22 extended) at some other point but still to be on the circle B. It can be seen that this would change the lag angle. Shifting 20' clockwise by the angle 20—2—20' on B would reduce the lag angle to zero and make the motion of the slider 6 isochronous. Attaching 20' at some other point on 22—not on B—would give the slider 6 (not the master slider) the motion of a crank driving an offset slider. Making the rods 11 and 17 of different lengths would give 22 a rocking motion on 2. It is thus apparent that the mechanism can give the same or different motions to a number of sliders.

Referring to Figures 3 to 7, inclusive, of the drawings, the invention is illustrated as applied to a fluid displacement engine or machine in which positive displacement of a working fluid against a pressure is effected by power applied to the drive of the engine, or in which a fluid under externally or internally created pressure is released or expanded through the engine to drive the latter by positive displacement and produce power thereby. The engine illustrated is a portion of a two-cycle rotary internal combustion engine which is the subject matter of my previously filed application, Ser. No. 650,018, above referred to.

The engine comprises a crank shaft 25 having a crank pin 26 upon which there may be mounted a hub member 27. A rotor 30 is rotatably mounted on the crank pin 26. The rotor 30 is disposed within a concentric annular casing 31 having side faces 33 with which the rotor 30 makes fluid-tight sliding contact. A plurality of radially movable sliders or pistons 35 form fluid-tight partitions across the space between the rotor 30 and the casing 31, the sliders being guided in the casing for reciprocation therein.

The sliders 35 are actuated through the following arrangement of parts: One of the sliders, called the master slider, has a connecting rod 37 journalled at its outer end on a pin 38 secured to the side of the piston. The opposite end of the connecting rod 37 is provided with a collar 39 which is journaled on the outside of the hub 27. The rod 37 is called the master rod.

The same slider 35 which carries the master rod 37 carries also a boss 41 which serves as a bearing for a master link 42. This master link 42 is indistinguishable from the other links 45, 46 and 47, but is so identified because its motions are fixed by those of the master rod 37 connected to the same slider. The inner end of the master link 42 is journaled on a bearing pin 50 carried by a link bearing ring or plate 51 which is freely mounted upon the hub 27.

All of the sliders are provided with link rods 45, 46 and 47, similarly journaled at their outer ends on the bosses 41 and at their inner ends on the link bearing ring 51. The length of the master rod 37 between centers is equal to the radius of the outer surface of the rotor 30. The length of the master link 42 and of all the link rods between centers is the same as that of the master 37. Since the sliders move in rectilinear paths, it follows that the construction described gives exactly the same slider motion to all sliders.

While the geometry of this design is somewhat more complicated than would be the case if each slider were provided with simple connecting rods, the construction is simplified and improved. The omission of the master rod would leave the link bearing ring uncontrolled in its oscillations save by the links and sliders, which in turn it is intended to control, and the construction without the master rod would throw unintended stresses on the links through frictional resistances of some of the sliders tending to oscillate the link bearing ring 51 in a manner to cause binding of other sliders against the slots or guideways in which the sliders are reciprocated. The distance between the pins 41 and 38 on the slider 35 carrying the master rod 37 is the same as the radius of the circle on which are located the pins 50 in the link ring or plate 51.

It can thus be seen that the rods 37 and 42 form two of the equal sides of a parallelogram, of which the radius and distance above referred to form the other pair of equal sides. The radius from the center of the crank pin 26 to the center of the pin 50 is thus always parallel with the center line of the slider, which is the line X passing through the centers of pins 41 and 38. Since the angle between the center line X in two sliders is the same as the angle between the radii to their pins 50, it follows that the center line X of a slider is always parallel with the radius to the center of the pin driving it through its link rod 42.

Figure 3:
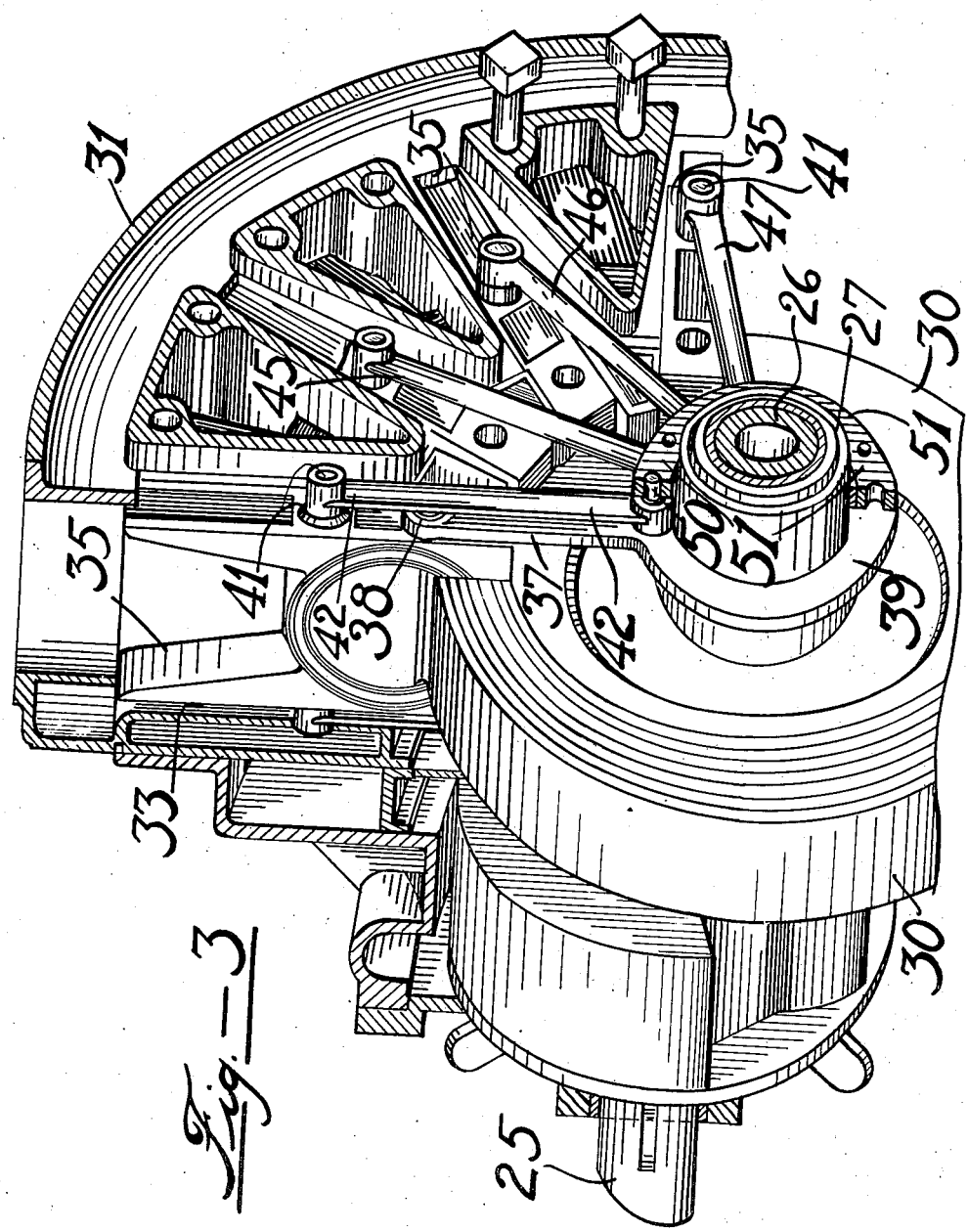
Figure 3 is a perspective view, with parts broken away, of the rotary engine described in the application Serial No. 650,018 above referred to, showing the application of the invention to the engine.
Figures 4, 5, 6, 7:
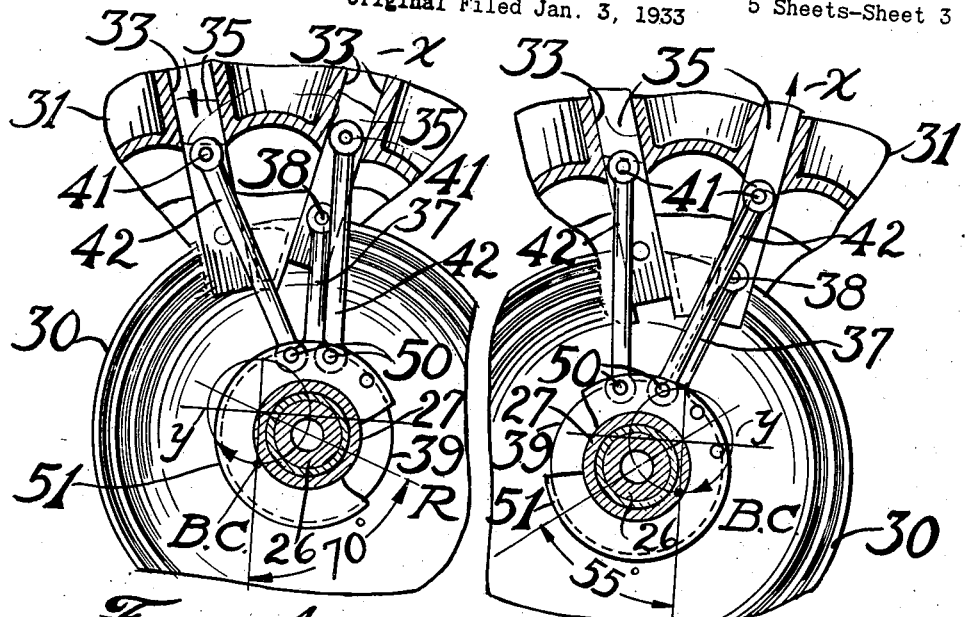
Figure 4 is a fragmentary vertical sectional view through the device of Figure 3, showing in side elevation the linkage arrangement for controlling reciprocation of the sliders with the crank pin at a point 70° before bottom dead center.
Figure 5 is a view similar to Figure 4, showing the crank pin moved to a position 58° before bottom dead center.
Figure 6 is a view similar to Figure 4, showing the crank pin moved to a position 50° past bottom dead center.
Figure 7 is a view similar to Figure 4, showing the crank pin moved to a position 55° past bottom dead center.

Referring to Figure 5, the apparatus of Fig. 3 is illustrated with the crank pin 2 moved to a position 58° before bottom dead center. Continued motion of the crank pin 2 is effected by first a downward and then an upward movement of the slider 35.

In Figure 6 the sliders are shown during their upward movement. In Fig. 7, the crank pin 2 is 55° past bottom dead center, and in Fig. 4, the crank pin has moved to a position 70° before bottom dead center.

By the construction described, the sliders 35 are operated by link rods connected to each slider and to a link freely mounted on the hub 27 and controlled by a master rod 37. An advantage of this construction is that it eliminates the necessity for connecting each link rod directly to the crank pin. Consequently, the length of the crank pin can be greatly shortened.

Referring to Figures 8, 9 and 10, the invention is illustrated as applied to a plurality of guideways 55 which may be unconnected with each other, but which are disposed substantially radially with respect to the crank shaft 1. The guideways 55 carry reciprocably mounted sliders 56. The connection between the sliders 56 and the crank shaft 1 is identical with that described in connection with Figures 3 to 7, inclusive, and like reference numerals have been applied to like parts. If desired, one or more of the sliders 56 can be connected by means of a suitable clevis or the like 57 with any desired operating device. It will be understood that power can be transmitted by means of the sliders 35 to the crank shaft 1 through the connecting mechanism described, or power can be transmitted from the crank shaft 1 to the sliders 35 or 56, as may be desired. The device is particularly applicable for use as a "power" for transmitting reciprocating motion to a plurality of oil pumps from a central power house in the pumping of wells in the oil fields.

Referring to Figures 11, 12 and 13, a modified form of the invention is illustrated, showing an arrangement of crank shaft and sliders identical with that illustrated in Figures 8, 9 and 10, and like reference numerals have been applied to like parts. In this form of the invention, however, a link bearing ring 60 is journaled on the hub 27 and carries pins 63 which serve as inner bearings for link rods 65 which operate the sliders 56. The link rods 65 are in the form of slightly bowed spring steel members which are anchored or journaled on pins 70 on the sliders 56. These directly connected short link rods 65 meet the geometrical requirements of the mechanism sufficiently well so that the departure from theoretical motion is so small as to be met by very slight expansion and contraction of the elastic link rods.

Various changes and alternate arrangements may be made within the scope of the appended claims, in which it is my intention to claim all novelty inherent in the invention as broadly as the prior art permits.

I claim:

1. In a mechanical movement, the combination with a crankshaft provided with a crank pin, a plurality of guideways radially disposed with respect to the crankshaft, sliders reciprocably mounted within the guideways, a member freely mounted on the crank pin, connecting rods of equal length between pivots pivoted to the member at radially equal distances and to the sliders, and means directly connected to one of the sliders and to the pin to prevent oscillation of the member.

2. In a mechanical movement, a crankshaft provided with a crank pin, a plurality of guideways radially disposed with respect to the crankshaft, pistons mounted for reciprocation in the guideways, a member freely mounted on the pin, connecting rods of equal length between pivots pivoted to the pistons and member at radially equal distances, and a master rod of the same length as the connecting rods between pivots pivotally connected to one of the pistons and to the crank pin whereby oscillation of the member is prevented upon rotation of the crank.

3. In a mechanical movement, the combination with a crank shaft provided with a crank pin, a plurality of guideways substantially radially disposed with respect to the crank shaft, sliders reciprocally mounted within the guideways, a member freely mounted on the crank pin, connecting rods secured to the member and to the sliders, and means directly connected to one of the sliders and to the pin to prevent oscillation of the member upon rotation of the crank shaft.

4. In a mechanical movement, a crank shaft provided with a crank pin, a plurality of guideways substantially radially disposed with respect to the crank shaft, sliders including a master slider mounted for reciprocation in the guideways, a member freely mounted on the pin, connecting rods pivoted to the sliders and member including a master connecting rod operatively connecting the master slider and member, and a master rod of the same length as the master connecting rod between pivots pivotally connected to the master slider and to the crank pin, whereby oscillation of the member is prevented upon rotation of the crank.

5. In a mechanical movement, a crank shaft provided with a crank pin, a guideway substantially radially disposed with respect to the crank shaft, a slider mounted for reciprocation in the guideway, a member freely mounted on the pin, a connecting rod secured to the slider and member, means connected to the slider and to the pin to prevent oscillation of the member, and at least one connecting rod operatively connected to the member for reciprocating movement upon rotation of the crank shaft.

6. In a mechanical movement, a crank shaft provided with a crank pin, a guideway substantially radially disposed with respect to the crank shaft, a slider mounted for reciprocation in the guideway, a member freely mounted on the pin, a connecting rod pivoted to the slider and member, a master rod of the same length as the connecting rod between pivots pivotally connected to the slider and to the crank pin whereby oscillation of the member is prevented upon rotation of the crank shaft, and at least one connecting rod operatively connected to the member for reciprocating movement upon rotation of the crank shaft.

FRANK A. HOWARD.